United States Patent Office 2,955,317
Patented Oct. 11, 1960

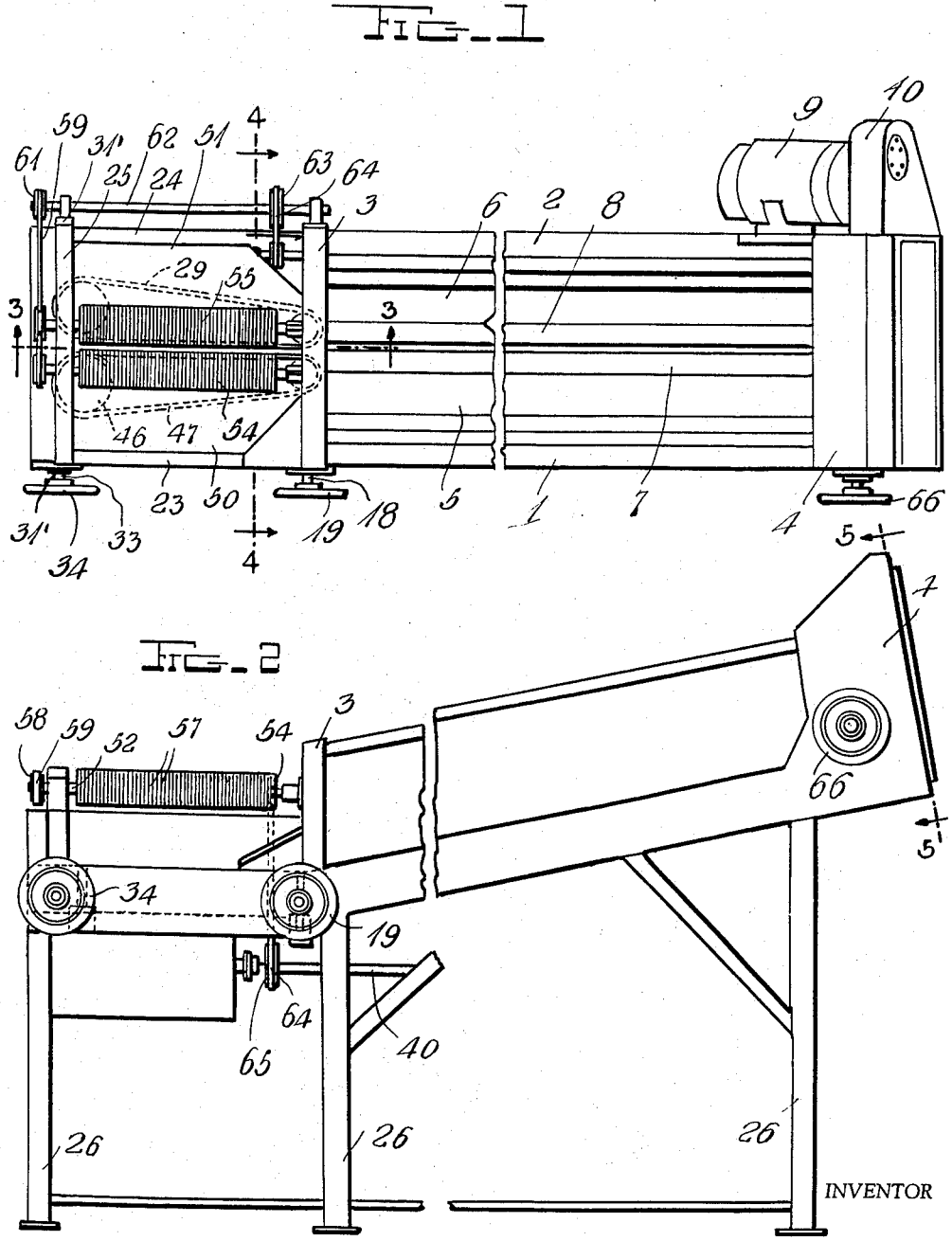

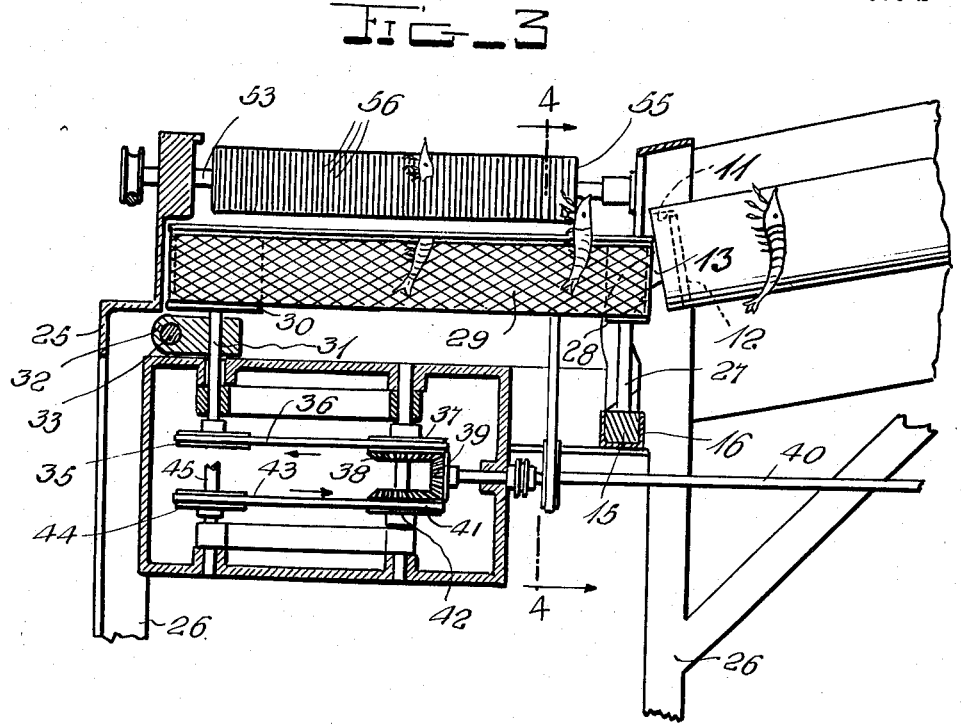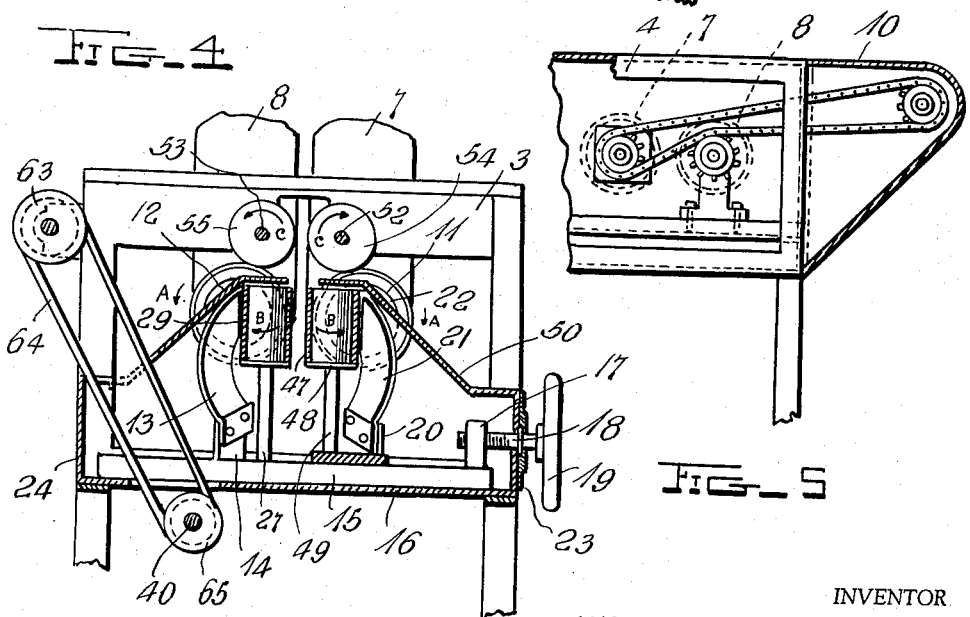

2,955,317

METHODS OF DEHEADING SHRIMP

Wallace N. Merrick, 825 W. Jefferson, Harlingen, Tex.

Original application July 19, 1957, Ser. No. 673,005. Divided and this application Dec. 31, 1958, Ser. No. 784,294

1 Claim. (Cl. 17—45)

The present invention is related to methods and devices for treating shrimp preparatory to rendering the same in a more preferred condition for eating and more particularly it is directed to a method and machine suitable for commercial use for separating the head of the shrimp from the body thereof.

The principal object of the invention is to provide a method for treating shrimp in large quantities quickly and without injury to the edible portion of the shrimp for separating the head thereof from the body portion and also provides for a machine for carrying out this method.

A still further and important object of the invention is to provide a machine into which large quantities or single shrimp can be fed and which machine will automatically properly position the shrimp, dehead the same and discharge the shrimp heads and bodies in separate directions apart from one another.

Another and equally important object of the invention is to provide a machine for separating the head of shrimp from the body thereof which machine can be quickly and easily adjusted even when in operation in order to position the elements thereof for properly handling different size shrimp and which machine conducts the shrimp in a straight line series of operations conveying, positioning, deheading and discharging the same permitting a plurality of the machines to be placed side by side and discharge the shrimp bodies into a series of containers or belts extending in a line at one end of the machines.

Further objects of the invention will be in part obvious and in part pointed out in the following description of the accompanying drawings, in which:

Fig. 1 is a top plan view of the present invention with the central portion broken away.

Fig. 2 is a side elevation of the present machine also with the medial portion broken away.

Fig. 3 is an enlarged longitudinal section taken on line 3—3 of Fig. 1.

Fig. 4 is an enlarged cross sectional view taken on line 4—4 of Fig. 1; and

Fig. 5 is a partial cross sectional view taken on lines 5—5 of Fig. 2.

Referring now more particularly to the accompanying drawings, wherein like and corresponding parts are designated by similar reference characters, numeral 1 refers to a side frame member while numeral 2 designates the opposite side frame member of the machine. A frame member 3 extends laterally of and connects corresponding ends of said side frame members while a housing 4 also extends laterally of and connects the opposite ends of said side frame members.

A pair of guide plates 5 and 6 are connected at one end to the end frame member 3 and at their opposite end to housing 4 and extend longitudinally of the machine and slant downwardly and inwardly laterally of said machine towards a pair of elongated rollers 7 and 8 which are positioned along side of one another but spaced apart.

A drive motor 9 is connected to a mechanism as shown in Fig. 5 within casing 10 and housing 4 for rotatably driving rollers 7 and 8 in an opposite direction as indicated by the arrows A along side thereof in Fig. 4 with said rollers being rotatably supported at their upper end within said housing 4.

Said mechanism includes a sprocket 9a connected to motor 9, a sprocket 7a connected to roller 7, sprocket 8a connected to roller 8 and an endless chain 10a extending around said sprocket operatively connecting the same.

Roller 8 has a recess lower end 11 as indicated in Figs. 3 and 4 within which is positioned a thrust bearing 12 mounted upon the end of an arm 13 rotatably supporting the lower end of said roller while arm 13 is mounted upon a lateral extension 14 of a bar 15 slidably mounted upon a frame member 16. Bar 15 further has a lateral projection 17 with a threaded portion through which extends a screw 18 in threaded engagement therewith and rotatable by a hand wheel 19.

A longitudinal frame 20 has an arm 21 fixedly mounted thereon which arm supports a thrust bearing 22 mounted within the lower recessed end 11' of roller 7 for rotatably supporting this lower end of said roller.

A frame 23 is connected at one end to end member 3 and extends in line with frame member 1 while a similar frame member 24 is also connected at one end to end member 3 and extends in line with side member 2. Said frame members 23 and 24 are connected at their opposite end by an end frame member 25.

A plurality of legs 26 supports said frame members 1, 2, 23 and 24 with members 1 and 2 extending on a slant relative to the horizontal with their uppermost end at housing 4 while side members 23 and 24 extend substantially horizontal.

A shaft 27 is fixedly mounted upon a bar 15 and extends upright therefrom with a roller 28 rotatably mounted upon the upper end thereof. A rough faced endless belt 29 extends around said roller 28 and also around a roller 30 fixedly connected to the end of a shaft 31.

Shaft 31 rotatably extends through frame 25 and a bearing block 32 which has a screw 33 in threaded engagement therein and which screw is controlled by a hand wheel 34 for providing lateral movement to shaft 31 as required. Rings 31' fixed to shaft 31 prevents longitudinal movement thereof. Shaft 31 has a pulley 35 fixedly connected to the opposite end thereof around which an endless belt 36 extends which flexible endless belt also extends around a pulley 37 driven by gear 38 in engagement with pinion 39 driven by a shaft 40 which in turn is rotated by a motor not shown.

Pinion 39 further drives gear 41 fixedly connected to pulley 42 around which extends an endless belt 43, which belt also extends around a pulley 44 to which is fixedly connected a shaft 45.

Shaft 45 has a drum 46 fixedly mounted upon the upper end thereof around which extends a rough faced endless belt 47 which also extends around a roller 48 rotatably mounted upon the end of shaft 49 fixedly mounted upon and extending upright from frame member 20 which frame member is connected to end frame members 3 and 25.

A shield 50 extends from frame member 23 to and above belt 47, while a similar shield 51 extends from belt 29 to frame member 24.

A shaft 52 is rotatably supported at one end upon frame member 3 and at its opposite end upon end frame member 25. Said shaft 52 extends substantially parallel to a second shaft 53 also rotatably supported by frame members 3 and 25. Said shafts have rough faced rollers 54 and 55 fixedly mounted thereon which rollers have a plurality of irregular lands and grooves 56 formed in the periphery thereof. A pulley 58 is fixedly mounted upon an end of shaft 52 and has an endless belt 59 extending therearound while said belt passes around the lower portion only of a pulley 60 fixedly connected to shaft 53 and then around a pulley 61 fixedly connected to a shaft 62. Said shaft 62 is rotatably supported by end frames 3 and 25 and has a further pulley 63 fixedly mounted thereon which is connected by endless belt 64 to a pulley 65 fixedly mounted on shaft 40.

The rotatable support of rollers 7 and 8 within housing 4 is controlled by a hand wheel 66 for moving said rollers laterally of one another as required and in any conventional manner.

Marine decapod crustaceans such as prawn and the larger shrimp, particularly those suitable for human consumption, have a long tapering body which is thicker at the head end portion and taper down to the thinner tail end portion. Further, these crustaceans have the head connected to the body by a relatively weak joint and the head portion is not suitable for being eaten while the body portion contains the meat which is highly desirable as a food and accordingly the heads are separated from the body before being sold as a food and generally before being cooked.

The present machine after being mounted with legs 26 on a substantially horizontal surface can be placed in operation by starting motor 9 rotating rollers 7 and 8 in opposite directions and also driving shaft 40 in any suitable manner. The shrimp to be processed are then dispensed onto the guide plates 5 and 6 which extend to the inner faces of rollers 7 and 8 and guide the shrimp downwardly to the space between said rollers which space is adjustable by rotating hand wheel 66 and/or wheel 19 which moves bar 15 on the channel member 16 supported by sides 23 and 24 thereby moving arm 13 and consequently roller 8. Roller 7 is fixedly supported by arm 21 on frame member 20 extending between ends 3 and 25 so that the roller 8 moves to and from roller 7 varying the space therebetween. This space is adjusted so that only the body portion of the shrimp can extend therethrough positioning the head of the shrimp thereabove. The rotation of the rollers and the fact that the body of the shrimp is longer than the head will jumble the shrimp around until their body portion extends between said rollers with the shrimp in series as indicated in Fig. 3. Further due to the slant of rollers 7 and 8, the shrimp will travel longitudinally of said rollers towards the lower end thereof and be dispensed therefrom.

The shrimp as dispensed are received between the belts 29 and 47 as the space between these belts extend in line with the space between rollers 7 and 8 and the adjustment of hand wheel 19 also moves shaft 27 and thus roller 28 while roller 48 remains fixed. As a result of the positioning of rollers 28 and 48, the opposing faces of belts 29 and 47 are in line with the opposing faces of rollers 8 and 7 respectively with the result that the width of the space between belts 47 and 29 is the same as the width of the space between rollers 7 and 8 at all times. However, said belts 29 and 47 are formed of a rough texture with at least their outer faces having a relatively rough surface whereby the body of the shrimp are gripped therebetween and carried along by said belts beyond the frame 25.

Rollers 54 and 55 are positioned above and in line with said belts 29 and 47 and positioned for engaging the head of the shrimp carried by said belt. Said rollers being caused to rotate in opposite directions as indicated by the arrows C in Fig. 4 will draw the shrimp heads upwardly longitudinally of their body which is retained against this pull by belts 29 and 47 and the rough surface of said rollers aids in gripping the shrimp heads as they are being pulled upwardly with the result that the head is drawn from the shrimp body at the point of the neck joint connecting the same. The shrimp heads pass upwardly between rollers 54 and 55 and are discharged therefrom into suitable receptacles not shown. The remaining body containing the muscle meat of the shrimp continues in a substantially perpendicular direction from the direction of the heads along with said belts and are dispensed therefrom at the left hand side of Figs. 1, 2 and 3 for being received by suitable receptacles (not shown).

Shaft 40 can be driven by motor 9 if so desired but it is preferable to connect the same to a separate source of motivation in order to separately control the speed of rotation of rollers 54 and 55 which rollers may be of a resilient material or non resilient as desired. Belts 29 and 47 are driven through their connection to shaft 40 in the direction indicated by the arrows B in Fig. 4 in order that their opposing faces move in the direction from frame 3 towards frame 25 for conveying the shrimp bodies in that direction.

The shrimp are positioned by the rollers 7 and 8 in a substantially perpendicular direction to the axis of said rollers due to the positioning of the shrimp body between the rollers and further shrimp are positioned one after another in a series by said rollers. Thus the shrimp are received and conveyed by the belts 29 and 47 in a substantially perpendicular direction to the horizontal while the heads are drawn from the bodies by the rollers 54 and 55 longitudinally of the shrimp body and thus at substantially right angles to the direction of conveyance of the shrimp body. Thus a novel method of positioning the shrimp and withdrawing the shrimp head from its body is provided thereby.

The present apparatus as well as the method for processing the shrimp is capable of considerable modification and such changes thereto as come within the scope of the appended claim are deemed to be parts of the present invention.

I claim:

A method of deheading a plurality of shrimp consisting in positioning said shrimp in a series and with their head uppermost, conveying said shrimp as positioned in a substantially straight direction laterally thereof, gripping the bodies only of said shrimp, retaining the same against longitudinal movement while continuing to convey the same, gripping and pulling the heads of the shrimp in a direction substantially at right angles to said direction of conveyance of the bodies thereof.

References Cited in the file of this patent

UNITED STATES PATENTS

| | | |
|---|---|---|
| 2,663,900 | Greiner et al. | Dec. 29, 1953 |
| 2,794,209 | Self | June 4, 1957 |